Jan. 26, 1943.  T. W. ADAIR  2,309,154
PACKING
Filed Dec. 11, 1939  2 Sheets-Sheet 1
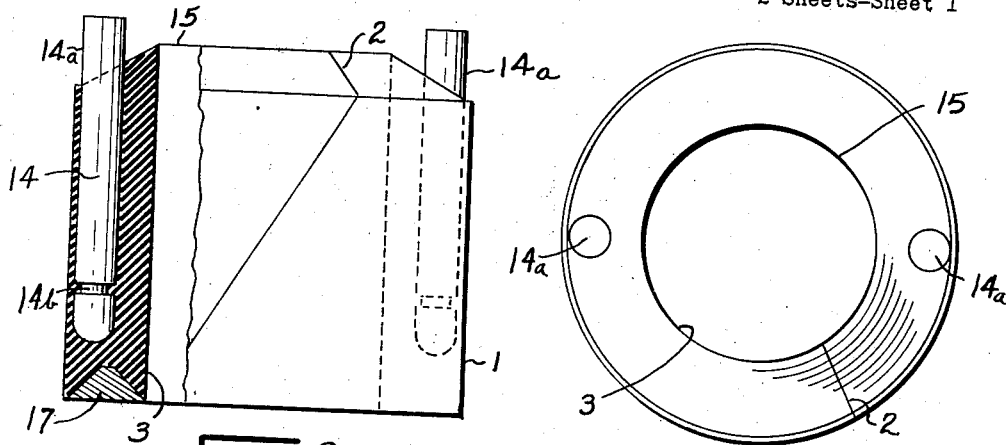
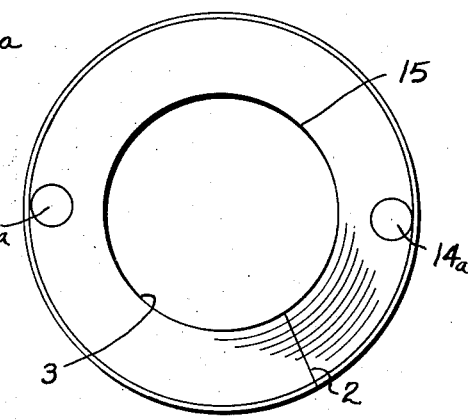
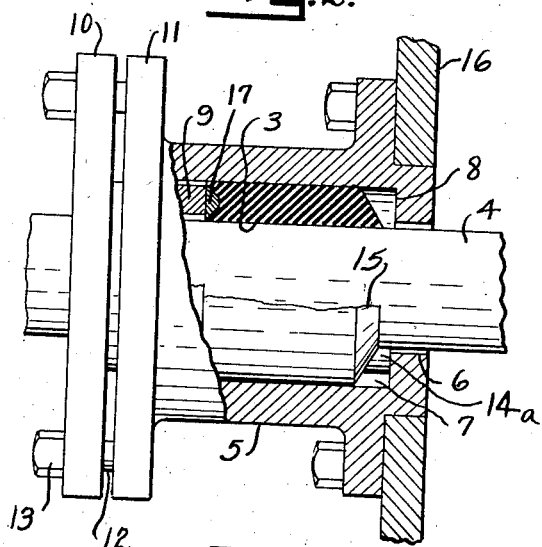
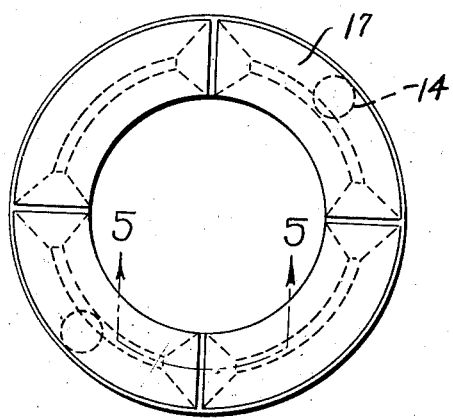
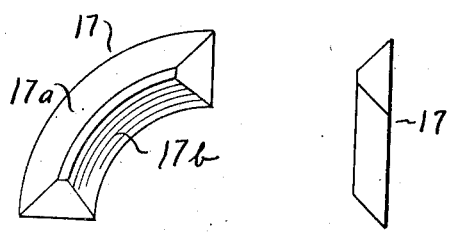
INVENTOR
THOMAS W. ADAIR
E. V. Hardway
ATTORNEY Jan. 26, 1943.　　　　T. W. ADAIR　　　　2,309,154
PACKING
Filed Dec. 11, 1939　　　2 Sheets-Sheet 2

Inventor
THOMAS W. ADAIR

By
E. V. Hardway
Attorney

Patented Jan. 26, 1943

2,309,154

UNITED STATES PATENT OFFICE 2,309,154

PACKING

Thomas W. Adair, Houston, Tex.

Application December 11, 1939, Serial No. 308,561

5 Claims. (Cl. 288—4)

This invention relates to a packing and has particular relation to that type of packing designed for use in packing movable rods, shafts, or other relatively movable parts.

An object of the invention is to provide a packing formed of yieldable material, such as rubber and sleeve-like in shape, with the end of the packing which is exposed to the pressure of the fluid being packed off being formed with a lip fitting closely around the rod or shaft or other movable part and means for so spacing the packing that the lip will be exposed to the full pressure of the liquid being packed off whereby the packing will be placed under compression by the pressure of the liquid rather than by the pressure of the packing gland and a fluid tight seal thus maintained about the rod or shaft or other movable part with a minimum of friction between the rod, shaft or part and the packing.

Another object of the invention is to provide novel means for protecting the other end of the packing sleeve against undue wear from the rod, shaft or other movable part.

It is another object of the invention to provide a stuffing box having a novel type of packing therein so formed and arranged that the packing will be under compression only when subjected to the pressure of the fluid and will be permitted to relax when not subjected to such pressure thereby relieving the shaft or rod and the packing from a considerable portion of the wear to which it would be subject if the packing were under constant compression from the packing gland.

The stuffing box, of which the packing forms a part, is particularly adapted for use in packing the rod of a slush pump used for pumping drilling mud or other gritty liquids although the packing is capable of general use for packing rods, shafts or movable parts.

With the above and other objects in view the invention has particular relations to certain novel features of construction, operation and arrangement of parts, an example of which is given in this specification and illustrated in the accompanying drawings, wherein—

Figure 1 shows a side elevation of a stuffing box, partly in section.

Figure 2 shows a side elevation of a split type of packing sleeve shown partly in section.

Figure 3 shows an end view thereof, as viewed from one end.

Figure 4 shows an end view as seen from the other end.

Figure 5 shows an enlarged, fragmentary, sectional view taken on the line 5—5 of Figure 4.

Figures 6 and 7 show side and edge views respectively of sections of a wear ring employed.

Figure 8:
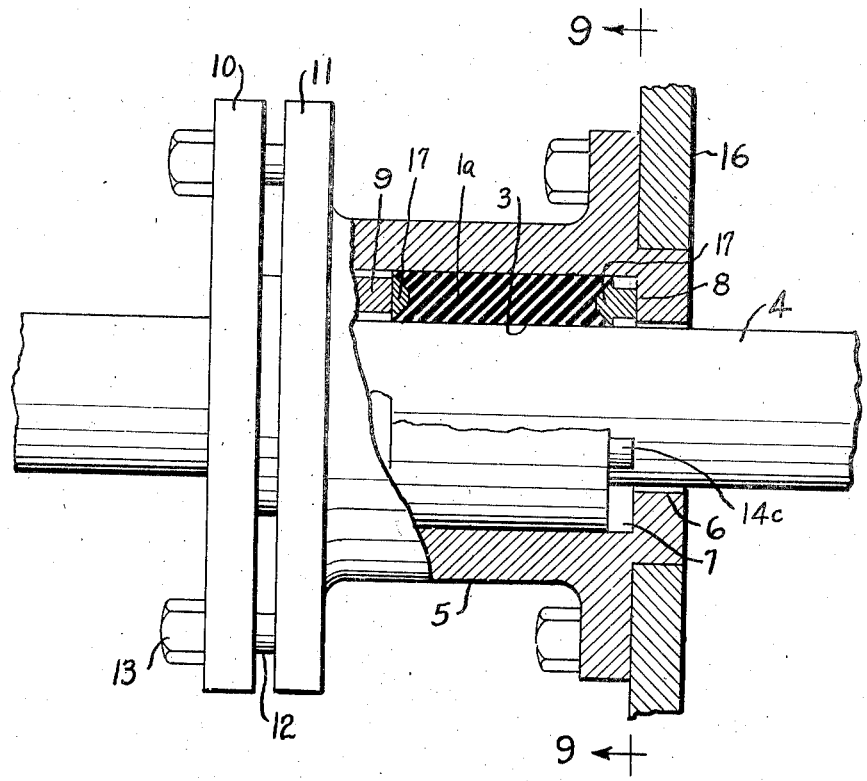
Figure 8 shows a side view of another embodiment of the invention, partly in section.

Referring now more particularly to the drawings wherein like numerals of reference designate the same parts in each of the figures, there is a packing assembly wherein the numeral 1 designates a sleeve-like packing formed of resilient material open at one side. As illustrated, it is formed with a slit 2 cut on the diagonal, although it may be made continuous. It is formed tubular to provide a rod or shaft bearing 3 through it to receive the rod or shaft 4.

In Figure 3 the packing assembly is shown mounted in the box 5 of a stuffing box assembly. At one end this box is provided with an opening 6 which surrounds the rod, or shaft, 4 loosely. The box 5 has the enlarged bore 7 to receive the packing sleeve 1. The enlargement of the bore forms an annular, inside ledge or shoulder 8 opposite the inner end of the sleeve 1. Fitted into the opposite end of the bore 7 there is a gland 9 which closely surrounds the rod or shaft 4 and which abuts the outer end of the packing assembly. The gland and the adjacent end of the box 5 are formed with registering flanges 10, 11 connected by the bolts 12 whose outer ends have the nuts 13 threaded thereon whereby the gland may be adjusted as desired against the outer end of the packing assembly.

Imbedded in the material of the packing sleeve are the rods 14, 14. The inner ends of these rods project a selected distance beyond the corresponding end of the packing forming spacers 14a, 14a as illustrated in Figures 1 and 2. These spaces abut the ledge 8 so as to hold the corresponding end of the packing sleeve spaced from said ledge. This end of the sleeve is inwardly beveled providing the internal, annular lip 15 which fits closely around the rod or shaft 4. The rods 14 are of somewhat less transverse diameter than the thickness of the packing as is illustrated in Figure 2 and their outer ends are preferably not extended entirely to the outer end of the sleeve 1 as is also indicated in Figure 1 and are provided with external, annular grooves 14b into which the packing material is molded to retain the rods in place.

When the stuffing box is assembled the gland 9 is adjusted against the outer end of the packing assembly so as to cause the spacers 14a to abut the shoulder or ledge 8 but not to place the packing under any considerable compression so that the packing will not unnecessarily grip the rod or shaft 4.

For the purposes of illustration the stuffing box is shown connected to a pump as 16. Upon pressure stroke of the pump plunger the liquid, under pressure, will be exerted through the opening 6 and against the lip 15 exposed thereto and said lip will be forced closely against the rod 4 so as to form a tight seal during the pressure stroke only. Upon back stroke of the pump piston the pressure will be relaxed against the packing and there will be very little friction between the rod and the packing sleeve so that the wear on both of these parts will be greatly reduced and the packing will be subjected to the required compression only when it is necessary to do so to pack off the liquid under compression.

A slitted type of packing sleeve, such as shown in Figure 2, will often be used on account of its convenience in application to a shaft or rod. However, when installed the pressure of the liquid acting against the lip 15 will contract said lip and will effectively close the slit 2. If the compression of the packing sleeve depended upon the pressure of the gland 9 thereagainst, as is the usual case, the pressure exerted by said gland would tend to open said slit and allow leakage.

Between the gland 9 and the opposing end of the resilient sleeve 1 there is a wear ring formed of arcuate sections 17. The outer faces of these sections 17 are plane and abut closely against the inner end of the gland 9, as shown more clearly in Figure 1. The inner side of each section is outwardly tapered each way toward the side margins and end margins and the corresponding end of the sleeve 1 is recessed, to receive said sections, the recesses conforming in shape to the shape of the inner side of the sections 17.

It will be noted from an inspection of Figures 4 and 5 that the ends of the sections 17 are spaced a distance apart. Upon assembly of the packing within the box 5 the sectional wear ring will surround the rod 4 rather closely and when the packing sleeve is subjected to endwise pressure by the liquid the wear ring will restrain the resilient material at the end of the sleeve and prevent it from flowing in between the rod 4 and the gland 9 thus reducing the wear on that end of the sleeve to a minimum.

It is to be further noted that the outer tapering face 17a of each section 17 is of somewhat greater area than the inner tapering face 17b so that the pressure against said outer face will exceed the pressure against said inner face thus tending to gradually force the sections inwardly reducing the inside diameter of the wear ring and the spaces between the sections of the wear ring are provided to permit this variation in said diameter. Accordingly, as the rod 4 becomes worn and of smaller outside diameter the wear ring, when the packing sleeve is subjected to pressure, will follow the reduced rod and at all times, when the sleeve is under pressure, will rather closely fit around the rod to prevent, or minimize the flow of resilient material between the wear ring and rod. The outer faces 17a of the wear ring sections will, however, also force the material of the sleeve 1 sufficiently closely against the wall of the box 5.

Figure 9:
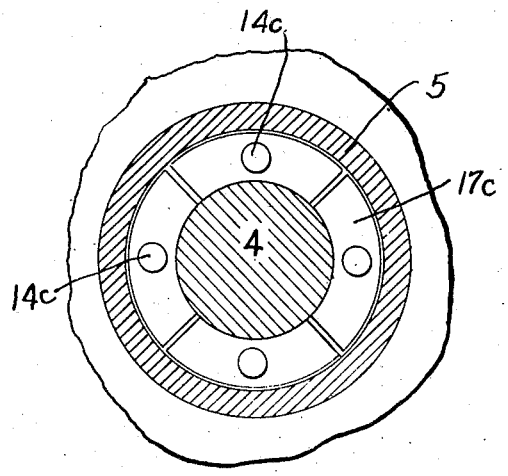
Figure 9 shows a fragmentary, cross-sectional view thereof.

In the embodiment illustrated in Figures 8 and 9 the end of the packing 1a opposite the shoulder 8 is also provided with a sectional ring which is formed of sections 17c. These sections 17c are shaped substantially of the same shape as the sections 17 and are provided for a similar purpose, the corresponding end of the sleeve 1a being recessed to receive said sections. Each section 17c has an outstanding boss 14c, said bosses abutting the shoulder 8 and performing the same function as the spacers 14a illustrated in Figures 1 and 2.

The drawings and description are illustrative merely, while the broad principle of the invention will be defined by the appended claims.

What I claim is:

1. A sleeve-like packing having an internal annular lip at one end, spacers at said end of the packing, a wear ring countersunk into the other end of the sleeve, said wear ring being formed of sections, the outer side of each section being substantially plane and the inner side thereof tapering toward its side margins and end margins.

2. A sleeve-like packing having an internal annular lip at one end, spacers at said end of the packing, a wear ring countersunk into the other end of the sleeve, said wear ring being formed of sections, the outer side of each section being substantially plane and the inner side thereof tapering toward its side margins and end margins, the sections of said wear ring being spaced apart.

3. A sleeve-like packing having an internal annular lip at one end, a wear ring countersunk into the other end of the sleeve, said wear ring being formed of sections which are movable independently of each other, the outer side of each section being substantially plane and the inner side thereof tapering toward its side margins and end margins.

4. A sleeve-like packing, a wear ring countersunk into one end of the packing and being formed of sections which are movable independently of each other, the inner side of each section of said wear ring tapering toward its side margins and end margins.

5. A packing comprising a sleeve-like packing member, a wear ring countersunk into each end of said packing member, each wear ring being formed of sections which are movable independently of each other, the inner side of each section of each wear ring tapering toward its side margins and end margins.

THOMAS W. ADAIR.